(12) United States Patent
Schenkl et al.

(10) Patent No.: US 10,465,323 B2
(45) Date of Patent: Nov. 5, 2019

(54) OPTICAL SENSOR FOR A LAUNDRY PROCESSING APPLIANCE

(71) Applicant: emz-Hanauer GmbH & Co. KGaA, Nabburg (DE)

(72) Inventors: Johann Schenkl, Bodenwoehr (DE); Georg Wilhelm, Guteneck (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 757 days.

(21) Appl. No.: 14/993,480

(22) Filed: Jan. 12, 2016

(65) Prior Publication Data

US 2017/0002492 A1    Jan. 5, 2017

(30) Foreign Application Priority Data

Jan. 13, 2015  (DE) ........................ 10 2015 000 447

(51) Int. Cl.
| | |
|---|---|
| *D06F 33/02* | (2006.01) |
| *D06F 37/24* | (2006.01) |
| *D06F 39/00* | (2006.01) |
| *G01B 11/27* | (2006.01) |
| *G01L 1/24* | (2006.01) |
| *G01L 1/25* | (2006.01) |
| *D06F 37/20* | (2006.01) |

(52) U.S. Cl.
CPC .............. *D06F 33/02* (2013.01); *D06F 37/24* (2013.01); *D06F 39/003* (2013.01); *G01B 11/272* (2013.01); *G01L 1/24* (2013.01); *G01L 1/25* (2013.01); *D06F 37/203* (2013.01); *D06F 2202/10* (2013.01)

(58) Field of Classification Search
CPC .......... D06F 33/02; D06F 37/24; D06F 39/00; G01B 11/272; G01L 1/24; G01L 1/25

USPC ..................................... 68/3 R, 12.01, 12.06
See application file for complete search history.

(56) References Cited

U.S. PATENT DOCUMENTS

| | | | |
|---|---|---|---|
| 8,888,929 B2 | 11/2014 | Schenkl et al. | |
| 2012/0073613 A1* | 3/2012 | Schenkl ............. | D06F 33/02 134/56 R |
| 2015/0042220 A1 | 2/2015 | Schenkl et al. | |

FOREIGN PATENT DOCUMENTS

| | | |
|---|---|---|
| DE | 2204325 A1 | 8/1973 |
| DE | 3619923 A1 | 1/1987 |
| DE | 9308118 U1 | 8/1993 |

(Continued)

OTHER PUBLICATIONS

Korean Patent Office, Office action in co-pending application KR 10-2016-0003704, dated May 31, 2017.

*Primary Examiner* — Levon J Shahinian
(74) *Attorney, Agent, or Firm* — Robert R. Deleault, Esq.; Mesmer & Deleault, PLLC

(57) ABSTRACT

An optical sensor includes a sensor housing having a through-opening that connects a housing interior and that has an opening longitudinal axis, a guide rod that is guided in an axially displaceable manner in the through-opening and that projects into the housing interior, and a reflective-surface carrier that is accommodated in the housing interior and that is motionally coupled to the guide rod and has a diffusely reflecting, reflective surface. The sensor also includes a light-emitting element and a light-receiving element, which are both disposed in a stationary manner relative to the sensor housing and are at a distance from the reflective surface that is dependent on the axial position of the reflective-surface carrier.

12 Claims, 5 Drawing Sheets

(56) References Cited

FOREIGN PATENT DOCUMENTS

| DE | 4319614 C1 | 8/1994 |
|---|---|---|
| DE | 102010013386 A1 | 10/2011 |
| KR | 10-1999-0069056 A | 6/1999 |

* cited by examiner

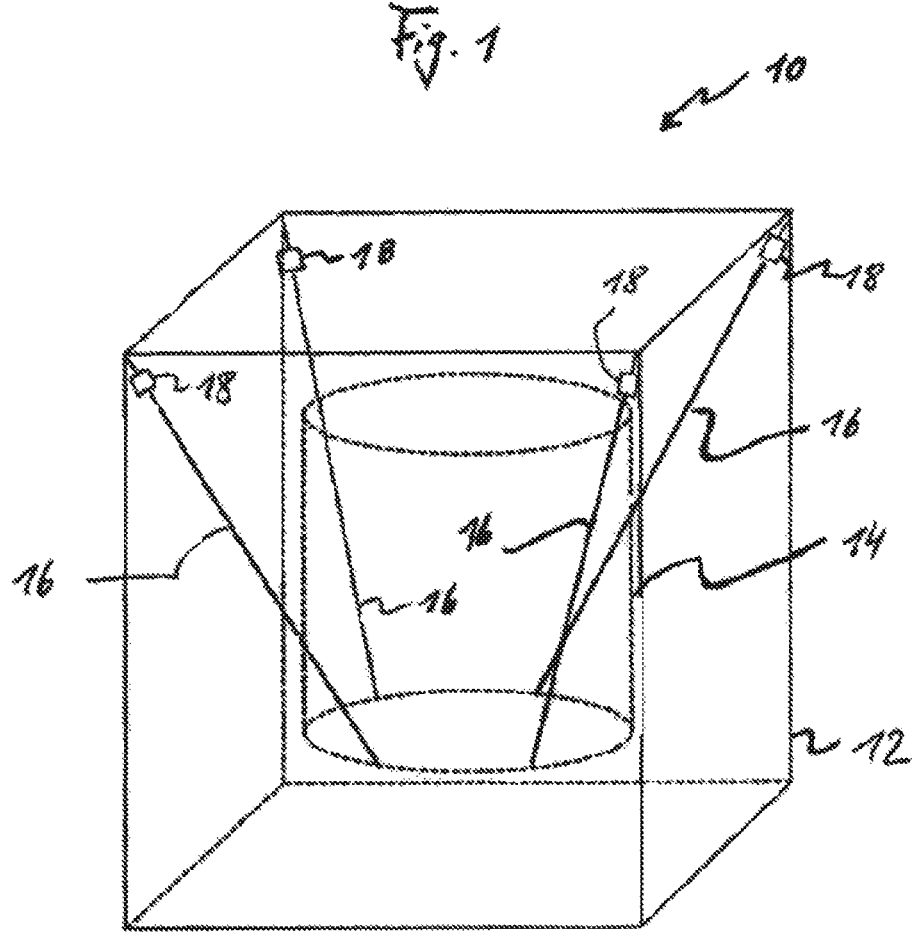

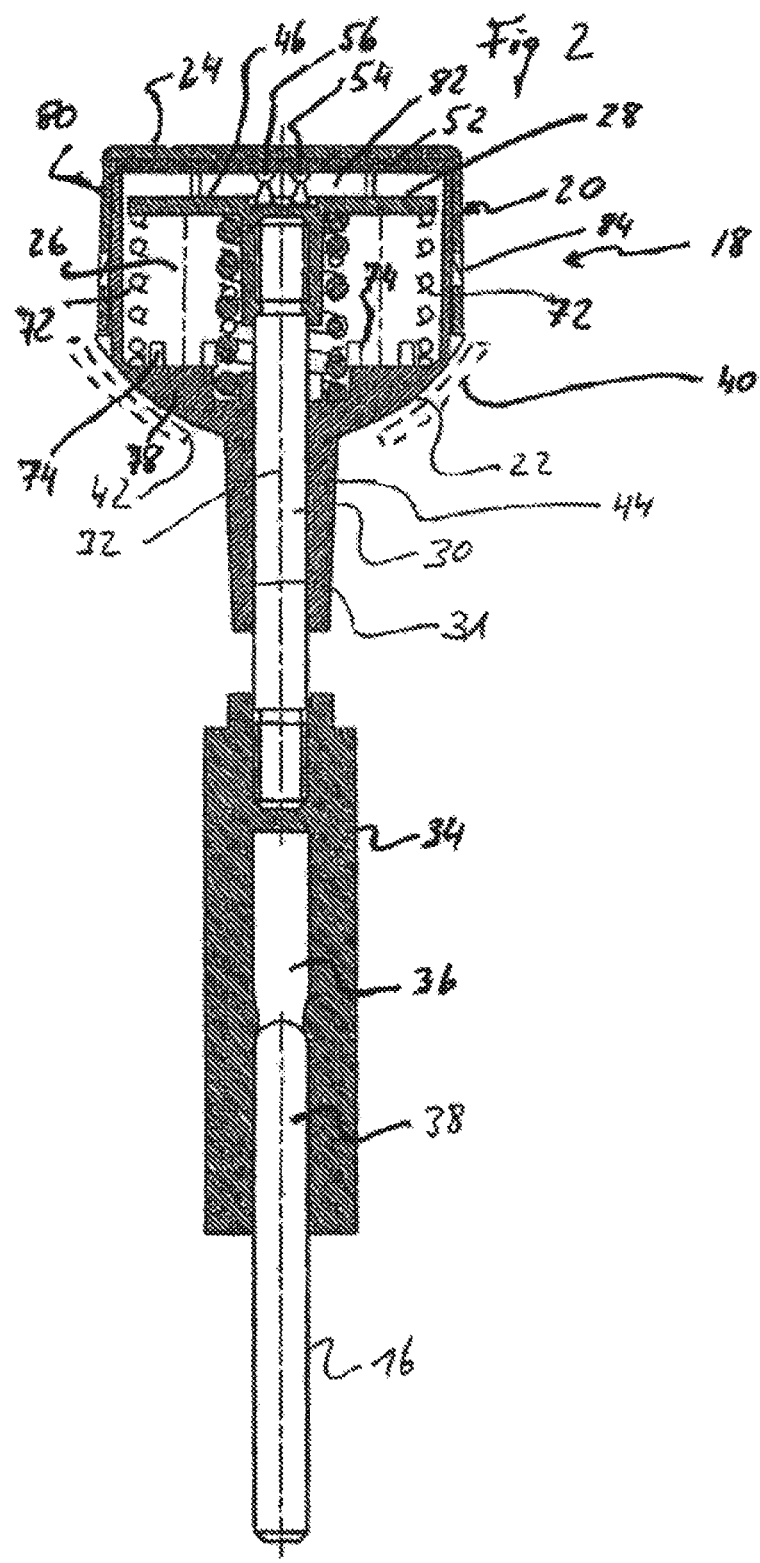

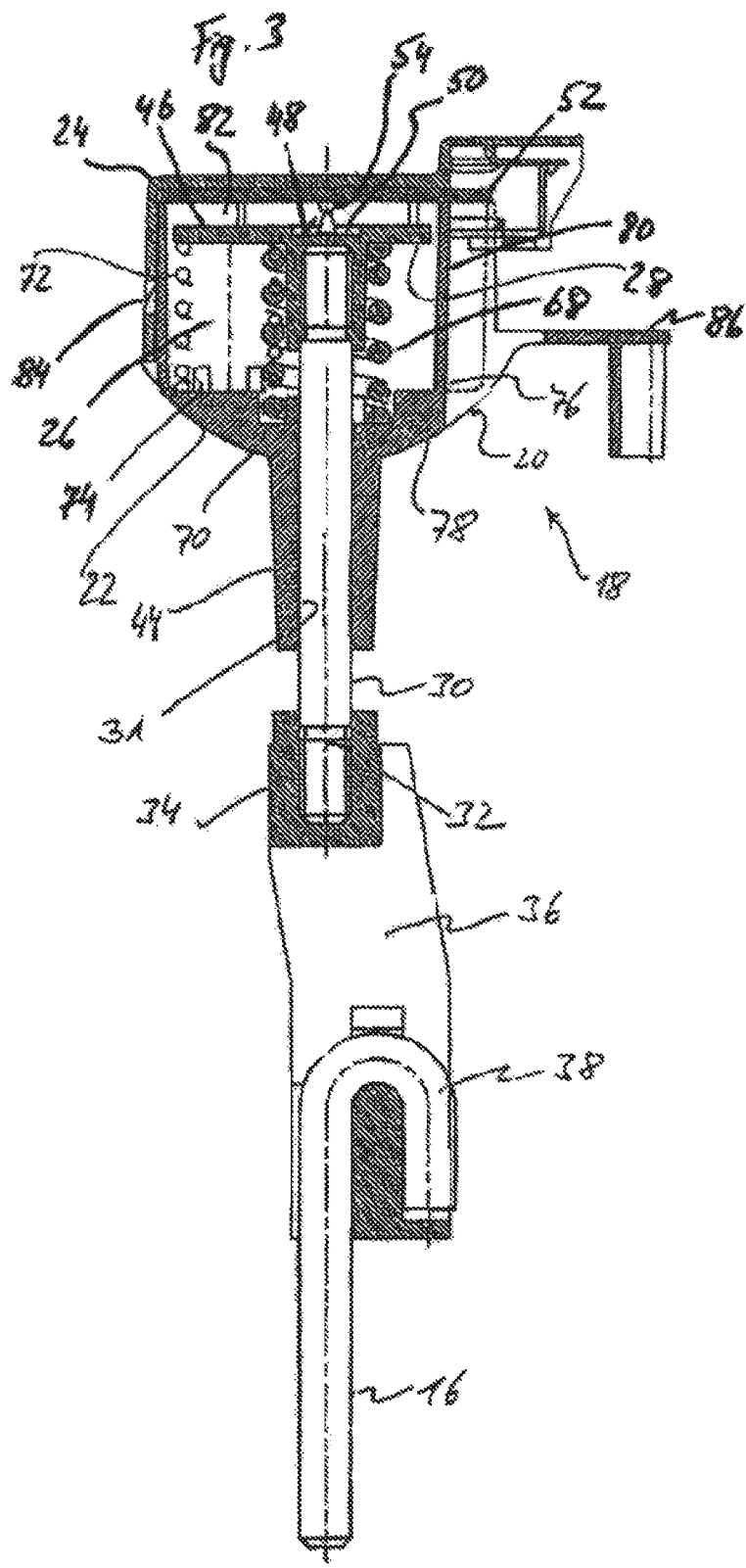

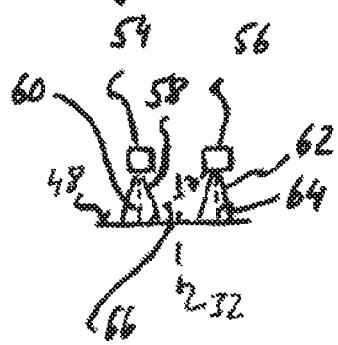
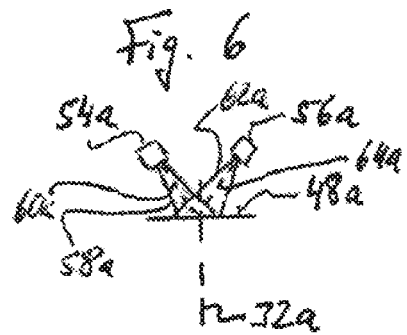

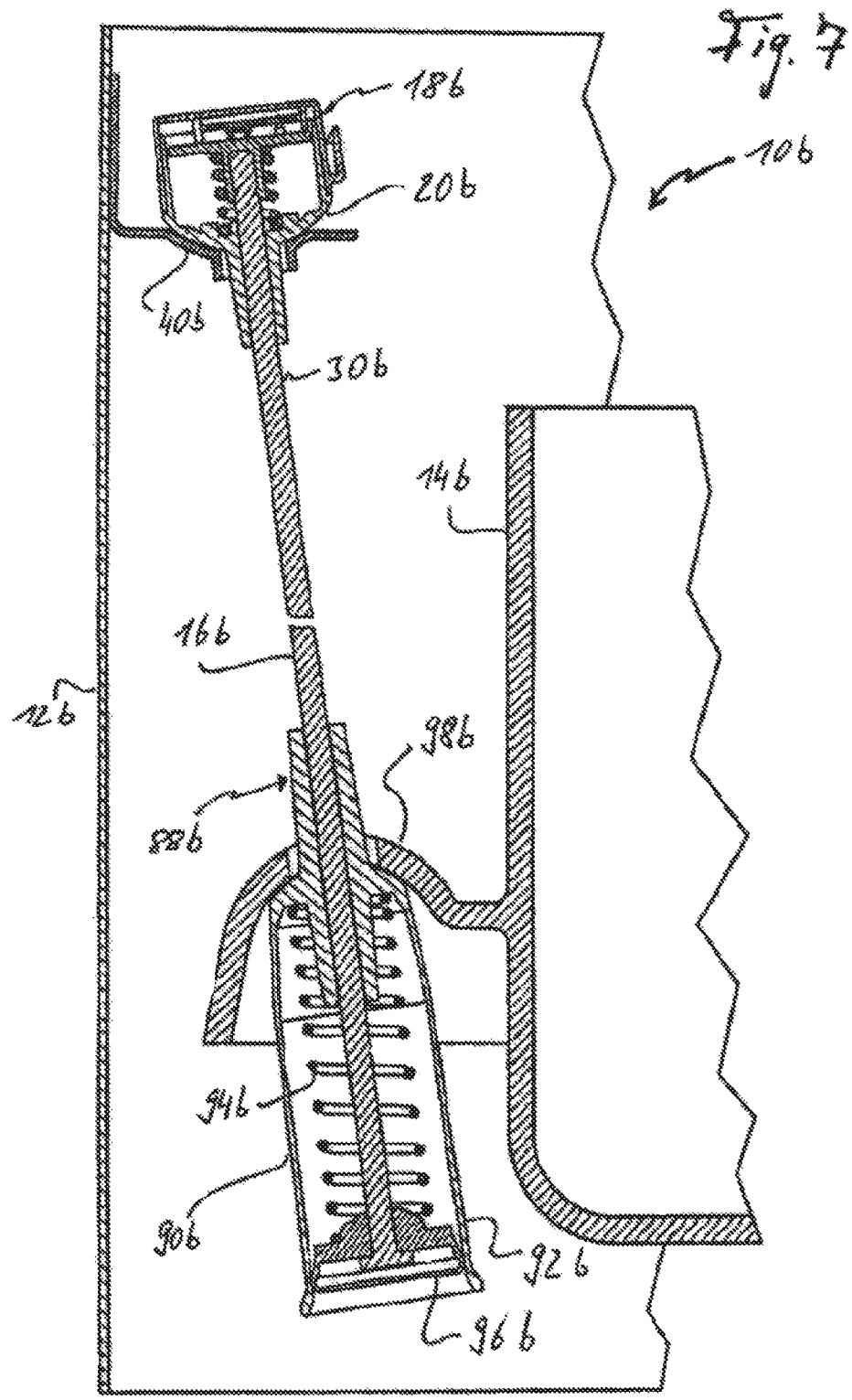

OPTICAL SENSOR FOR A LAUNDRY PROCESSING APPLIANCE

BACKGROUND OF THE INVENTION

1. Field of the Invention

The present invention relates to an optical sensor that can be used in a domestic washing machine or other laundry processing appliance. Particularly, the present invention relates to an optical sensor for measuring forces occurring in the appliance.

2. Description of the Prior Art

In the case of so-called top-loader washing machines, for example, an optical sensor can be used to measure forces exerted by a tub, suspended on a plurality of carrying rods in a machine housing, upon one of the carrying rods. Such force measurements may be used, for example, to deduce the quantity of laundry filled into the tub, its absorbency, its weight when wet, its weight when moist, and numerous other operating states of the machine. The range of application of the sensor is not limited, however, to the measurement of force in a laundry processing appliance. In principle, the sensor is available for any measurement applications in which changes in position of a first component, relative to a second component, are to be sensed by means of light (i.e. optically).

Known from DE 10 2010 013 386 A1, in combination with FIG. 4 therein, is an optical sensor, in which a reflective-surface carrier is coupled to a measuring rod and, by means of a helical spring, is biased into a neutral position relative to a sensor housing. The reflective-surface carrier provides two reflective surfaces, which are both irradiated by a light beam in an eccentrically offset manner in relation to a rod axis of the measuring rod. The intensity of the reflected radiation sensed by a detector varies according to an axial distance of the reflective-surface carrier from an element emitting the respective light beam.

SUMMARY OF THE INVENTION

The invention is based on an optical sensor, comprising a sensor housing having a through-opening that connects a housing interior to a housing exterior and that has an opening longitudinal axis, a guide rod that is guided in an axially displaceable manner in the through-opening and that projects into the housing interior, a reflective-surface carrier that is accommodated in the housing interior and that is motionally coupled to the guide rod and has a reflective surface, and a light-emitting element and a light-receiving element, which are both disposed in a stationary manner relative to the sensor housing and are at a distance from the reflective surface that is dependent on the axial position of the reflective-surface carrier.

According to the invention, in the case of such a sensor, at least one of the following conditions (a) to (d) is fulfilled:

(a) the light-emitting element and the light-receiving element are opposite each other in respect of the opening longitudinal axis;

(b) a lobe axis of a main radiating lobe of the light-emitting element and a lobe axis of a main receiving lobe of the light-receiving element are opposite each other in respect of the opening longitudinal axis;

c) for at least some of the axial distances of the reflective surface, relative to the light-emitting element and the light-receiving element, that occur in the case of proper operation, a light beam emitted by the light-emitting element is incident upon the reflective surface in a region through which the opening longitudinal axis passes;

d) for at least some of the axial distances of the reflective surface, relative to the light-emitting element and the light-receiving element, that occur in the case of proper operation, the opening longitudinal axis passes through light rays that go from the reflective surface in the direction of the light-receiving element.

The above measures may each individually, or also jointly, require a design in which a light beam emitted by the light-emitting element is incident upon the reflective surface comparatively close to the axis (in respect of the opening longitudinal axis). Tilting of the reflective-surface carrier then does not affect, or in any case does not substantially affect, the radiant intensity detected by the light-receiving element. Accordingly, such tilting, which is often unavoidable in the rough working environment, for example of a washing machine, has only a small effect upon the measurement signal (if at all). The measurement accuracy that can be achieved with the optical sensor is correspondingly high.

The main radiating lobe of the light-emitting element and/or the main receiving lobe of the light-receiving element may have a lobe axis that is substantially parallel to the opening longitudinal axis, while the reflective surface has a surface normal that is substantially parallel to the opening longitudinal axis.

According to one embodiment, the typically divergent light beam emitted by the light-emitting element in the direction of the reflective surface may have a beam axis that is parallel to the opening longitudinal axis, but radially offset in relation to the latter. In the case of another embodiment, this light beam may be coaxial with the opening longitudinal axis, i.e. the beam axis and opening longitudinal axis coincide. In principle, of course, it is also conceivable for the beam axis of such a light beam to run obliquely in relation to the opening longitudinal axis.

In the case of one embodiment of the invention, the reflective-surface carrier is inseparably connected to the guide rod. For this purpose, it may be constituted by a plastic body injection-moulded on to the guide rod. Alternative forms of connection such as, for example, a screwed connection, between the reflective-surface carrier and the guide rod are clearly conceivable.

A helical spring, which is disposed centrally in relation to the opening longitudinal axis and which serves to bias the reflective-surface carrier axially relative to the sensor housing, may be disposed in the housing interior. In the case of an alternative embodiment, a plurality of helical springs, disposed with a distribution at substantially equal angular distances around the opening longitudinal axis, are accommodated in the housing interior. If the sensor is intended to be fitted in a washing machine, the one variant or the other variant may be selected, depending on the maximum loading of the washing machine. In the case of a relatively large maximum loading, the variant with the plurality of helical springs may be selected, and the variant with the individual helical spring selected in the case of a lesser maximum loading.

According to one embodiment, the sensor may optionally be able to be equipped with a differing number of helical springs for axially biasing the reflective-surface carrier relative to the sensor housing. For this purpose, suitable positioning formations that enable the sensor to be equipped, optionally, with a helical spring disposed centrally in relation to the opening longitudinal axis, or with a plurality of helical springs disposed with a distribution at substantially equal angular distances around the opening longitudinal axis, may be formed on the sensor housing and/or on the reflective-surface carrier.

The reflective surface may be formed in a depression that is central in relation to the opening longitudinal axis and that is formed on a side of the reflective-surface carrier that faces towards the light-emitting element and the light-receiving element.

According to an embodiment, the guide rod may be connected, in the region of a rod end that is outside of the housing interior, to a separately produced coupling piece designed for coupling a rod-type connecting element. The coupling piece may be screw-connected, for example, to the guide rod. Preferably, the connection of the coupling piece to the guide rod is separable.

For the purpose of coupling the connecting element, the coupling piece may have a transverse passage that enables an end hook of the connecting element to be hung in the coupling piece. The connecting element may be, for example, a carrying rod that, together with further carrying rods, carries a wash-tub in a machine housing of a washing machine.

The sensor housing may have a housing lower part and a cover part, the housing lower part constituting a pot-type housing portion that has a pot base, a pot casing and a pot opening. In order to close off the sensor housing outwardly, the cover part is placed on the pot-type housing portion. The through-opening for the guide rod extends through the pot base.

If the sensor housing is designed thus, it may be provided that a printed circuit board carrying the light-emitting element and the light-receiving element covers the pot opening, over the full opening extent thereof. For the purpose of fixing such a printed circuit board relative to the sensor housing, the printed circuit board may be clamped-in axially between the cover part and the pot casing.

According to an embodiment of the invention, the reflective-surface carrier may constitute a plate piece, which extends beyond an axial end of the guide rod and has a plate plane that is orthogonal to the opening longitudinal axis. On its plate side that faces away from the guide rod, the plate piece has the reflective surface, while, on its other plate side, it provides support points for one or more biasing springs, for biasing the reflective-surface carrier relative to the sensor housing.

In the case of an exemplary embodiment of a method for producing the optical sensor of the type described above, the reflective-surface carrier is connected to the guide rod to form a partial assembly. This partial assembly is then mounted in the sensor housing by insertion of the guide rod into the through-opening.

According to a further aspect, the invention provides a laundry processing appliance, comprising an appliance housing, a tub suspended in the appliance housing via a plurality of carrying rods and having a laundry processing drum that is rotatable therein, and at least one optical sensor of the type described above. The guide rod of the sensor is coupled to one of the carrying rods, or is integrally formed with one of the carrying rods, whereas the sensor housing is supported on the appliance housing.

A support shell, which is assigned to each optical sensor and in which the respective sensor is inserted, may be realized on the appliance housing. The support shell in this case may have an opening for through passage of the guide rod, in the region of a shell base.

In the case of the laundry processing appliance, at least one carrying rod of the plurality of carrying rods that is assigned to an optical sensor may be shaped, in the region of a rod end close to a sensor, to form a hook, which is hung in a transverse passage of the guide rod or of a coupling piece of the sensor that is connected to the guide rod.

In the case of an exemplary embodiment of a production process for the laundry processing appliance, the sensor is pre-mounted, to form an assembly. One of the carrying rods is then coupled to a part of the guide rod of this pre-mounted assembly that projects out of the sensor housing.

The invention is explained further in the following on the basis of the appended drawings.

BRIEF DESCRIPTION OF THE DRAWINGS

FIG. 1 shows a schematic representation of an embodiment of a domestic washing machine, of the top-loader type.

FIG. 2 shows a partially sectional view of an optical sensor, according to an embodiment, coupled to a carrying rod of the washing machine.

FIG. 3 shows the sensor components of FIG. 2, in a view rotated by 90 degrees.

FIG. 4 shows a schematic configuration diagram of a light-emitting element and of a light-receiving element, relative to a reflective surface, in the case of the sensor according to the embodiment of FIGS. 2 and 3.

FIG. 5 shows a schematic representation of the relative position of a light-emitting element and of a light-receiving element, in respect of an opening longitudinal axis, in the case of the sensor according to the embodiment of FIGS. 2 and 3.

FIG. 6 shows a schematic configuration diagram of a light-emitting element and of a light-receiving element, relative to a reflective surface, according to a variant.

FIG. 7 shows a sectional view of a carrying-rod assembly, having an integrated optical sensor, for a washing machine, according to a further exemplary embodiment.

DETAILED DESCRIPTION OF THE INVENTION

Reference is made firstly to FIG. 1. This shows a washing machine for domestic use, denoted in general by 10, which comprises a machine housing 12 and a tub 14 that is suspended in the machine housing 12. Four carrying rods 16, which project from the tub 14 to respectively one of the upper corner regions of the machine housing 12, serve to suspend the tub 14. In the exemplary case shown, each carrying rod 16 has an assigned optical sensor 18, which serves to measure the force exerted upon the respective carrying rod 16 by the tub 14.

Each of the sensors 18 is coupled between the machine housing 12 and the respective carrying rod 16. It responds to changes in the position of the respective carrying rod 16 relative to the machine housing 12. The sensor 18 emits a sensor signal of differing signal strength, depending on the relative position between a carrying rod 16 and the machine housing 12. From this signal, a control unit, not represented in greater detail, which receives the sensor signals of the sensors 18, can determine information that is representative of the force of the respective carrying rod 16. From the force information obtained by the control unit for the various carrying rods 16, the control unit can deduce various parameters of relevance to the wash program, for example the quantity of dirty laundry filled into the tub 14, the quantity of water put into the tub 14, and the like. Clearly, not all carrying rods 16 need be equipped with a sensor 18. In the case of other embodiments, it may suffice if only some of the carrying rods 16 are each equipped with a sensor 18, for example two mutually opposite carrying rods.

For the structure of the sensors 18 and coupling thereof to the respective carrying rod 16, reference is now made to FIGS. 2 and 3. The details shown therein and explained in the following are applicable to at least one of the sensors 18 and the associated carrying rod 16. Clearly, all sensors 18 may have the same structure.

According to FIGS. 2 and 3, the sensor 18 has a two-part sensor housing 20, having a housing lower part 22 and a cover part 24. When in the assembled state, the housing lower part 22 and the cover part 24 delimit a housing interior 26, which is tightly sealed outwardly and may be filled, for example, with a gas other than air or with a liquid or gel-type medium. A reflective-surface carrier 28, which is fixedly coupled to a rod end of a guide rod 30, is accommodated in the housing interior 26. The guide rod 30 extends through a through-opening 30 formed in the housing lower part 22, and projects with the respective rod end into the housing interior 26. The through-opening 31 defines an opening longitudinal axis 32, which coincides with a rod axis of the guide rod 30. The guide rod 30 is guided in the through-opening 31 so as to be displaceable in the longitudinal direction of the rod, i.e. axially. With its other axial end, it projects out of the sensor housing 20 and, in the region of this projecting axial end, is coupled to a coupling piece 34. The coupling piece 34 is, for example, a plastic part, and is separably connected to the guide rod 30, for example by a screwed connection. The coupling piece 34 serves as an adapter between the sensor 18 and the carrying rod 16. It has a transverse passage 36, in which an end portion 38 of the carrying rod 16, bent in the shape of a hook, can be hung. For the mechanical coupling between the sensor 18 and the carrying rod 16, therefore, the latter does not have to be passed through the sensor 18.

The sensor 18, when properly fitted in the washing machine 10, sits in a seating shell 40, indicated by a broken line in FIG. 2, which, in the region of its shell base, has an opening 42, through which there extends an axial housing extension 44 of the housing lower part 22. The seating shell 40 constitutes a seating surface, for example having the shape of a spherical surface, on which the sensor 18 is seated, via a correspondingly shaped housing outer surface. In the exemplary case shown, this housing outer surface is constituted by the housing lower part 22. The seating shell 40 may be constituted, for example, by a suitably shaped sheet-metal piece, which is part of the machine housing 12. The opening 42 is dimensioned such that the housing lower part 22 can rotate relative to the seating shell 40 in the manner of a ball joint, i.e. the seating shell 40 constitutes a bearing socket for mounting the housing lower part 22 in a swivelable manner.

The reflective-surface carrier 28 constitutes a plate piece 46, which largely fills the housing interior 26 in a radial plane, and whose plate normal is parallel to the opening longitudinal axis 32 and which, on its plate side that faces away from the guide rod 30 (the upper plate side in the representation of FIGS. 2 and 3), constitutes a reflective surface 48. In the exemplary case shown, the reflective surface 48 is formed at the base of a depression 50 that is formed into the plate upper side of the plate piece 46. The depression 50 may have, for example, a circular shape, and be disposed centrally in relation to the opening longitudinal axis 32. The reflective surface 48 is constituted, for example, by a diffusely reflecting, for example white, plastic body, or alternatively by a metallization layer applied to the plate piece 46.

Fitted in the sensor 18, axially above the plate piece 46, there is a printed circuit board 52, which serves as a carrier for a light-emitting element 54 (e.g. LED) and a light-receiving element 56 (e.g. phototransistor). The light-emitting element 54 and the light-receiving element 56 are opposite each other in respect of the opening longitudinal axis 32, as shown in FIG. 5. In other words, the opening longitudinal axis 32 extends through between the two elements 54, 56. The light-emitting element 54 has a radiation characteristic having a main lobe 58 (FIG. 4), the lobe axis 60 of which is parallel to the opening longitudinal axis 32 and therefore perpendicular to the reflective surface 48. Similarly, the light-receiving element 56 has a receiving characteristic having a main lobe 62, the lobe axis 64 of which is parallel to the opening longitudinal axis 32 and therefore perpendicular to the reflective surface 48. Insofar as the reflective surface 48 is diffusely reflecting (for example, in the manner of a Lambertian emitter), the two main lobes 58, 62 can be non-overlapping at the site of the reflective surface 48, as is indicated in FIG. 4. Owing to the diffuse reflection exerted by the reflective surface 48 upon light that is emitted by the light-emitting element 54, a sufficient quantity of light does nevertheless go from the reflective surface 48 to the light-receiving element 56. This is indicated exemplarily in FIG. 4 by a broken-line light ray 66. On the other hand, insofar as the reflective surface 48 does not have scattering properties, and incident light is reflected only according to the known reflection law, angle of incidence=angle of reflection, an overlap of the main lobes 58, 62 at the site of the reflective surface 48 is advisable.

In the case of particular embodiments, the mutual distance between the light-emitting element 54 and the light-receiving element 56 is in the range of some millimetres, for example approximately 1 to 3 mm.

The reflective-surface carrier 28 is biased axially by a spring arrangement, relative to the sensor housing 20, to a neutral position. Provided for this purpose, in the exemplary case shown in FIGS. 2 and 3, there is a single helical compression spring 68, which is disposed centrally in relation to the guide rod 30 and surrounds the latter. The helical compression spring 68 is supported, on the one hand, on the housing lower part 22 and, on the other hand, on the underside of the plate piece 46 of the reflective-surface carrier 28. A depression 70, in which the helical compression spring 68 is inserted, is provided on the housing lower part 22 for the purpose of positioning the helical compression spring 68 in a stable manner. The depression 70 prevents the helical spring 68 from slipping relative to the housing lower part 22.

Instead of a single, centrally disposed spring, the sensor 18 may alternatively be equipped with a plurality of spring elements (for example, helical compression springs) 72, which are inserted in the housing interior 26, distributed circumferentially around the guide rod 30. In FIGS. 2 and 3, the spring elements 72 are indicated merely in a rudimentary manner. For example, a total of three spring elements 72 may be provided at mutual angular distances of approximately 120 degrees. In the case of certain embodiments, it may optionally be possible for the sensor 18 to be equipped with a central biasing spring 68 or a plurality of peripheral biasing springs 72, depending on the expected forces acting upon the sensor 18. If the washing machine in which the sensor 18 is to be inserted has a comparatively small maximum laundry load (e.g. 5 kg), a single biasing spring 68 may suffice. If, on the other hand, the washing machine is designed for a comparatively large load (e.g. 10 kg or 12 kg), it may be that the central biasing spring 68 is not sufficient and, instead, a plurality of biasing springs 72 must be used. In order to ensure that, in equipping the sensor 18 with biasing springs 72, the springs are positioned in a stable manner, positioning projections 74, which secure the biasing springs 72 against slipping sideways relative to the housing lower part 22, are provided on the housing lower part. Clearly, suitable formations, for example in the form of projections or depressions, by means of which the biasing springs 72 are stopped from slipping sideways, may also be realized on the reflective-surface carrier 28 (more precisely, on the underside of the plate piece 46).

The housing lower part 22 constitutes a pot-type housing portion 76, having a pot base 78 and a pot casing 80. At the upper end of the pot casing 80, the pot-type housing portion 76 has a pot opening 82. The printed circuit board 52 covers the pot opening 82 substantially completely, and is clamped-in between the upper edge of the pot casing 80 and the cover part 24. During assembly, the printed circuit board 52 is first placed on the pot casing 80, whereupon the cover part 24 is slipped on over the printed circuit board 52 and the pot casing 80. At 84, on the outer circumferential side of the pot casing 80 and on the inner circumferential side of the cover part 24, locking formations are formed, which act in combination, allowing the cover part 24 to be separably locked in place on the housing lower part 22.

The housing lower part 22 has a radial positioning extension 86, which engages in a recess of the machine housing of the washing machine, not represented in greater detail, and thereby causes the sensor 18 to be secured against rotation in the seating shell 40.

When the sensor 18 is being mounted, the guide rod 30, to which the reflective-surface carrier 28 is inseparably attached, for example by injection moulding, is introduced, with its free end foremost, into the through-opening 31 of the housing lower part 22, until it emerges at the lower end of the housing extension 44. The printed circuit board 52 and the cover part 24 are then placed on the housing lower part 22. The thus created preassembled sensor assembly can then be connected to the carrier rod 16, via the coupling piece 34.

FIG. 6 shows a variant in which elements that are the same or have the same function are denoted with the same references as in the previous figures, but with a lower-case letter suffix. For explanation of these elements, reference is to be made to the statements above, unless otherwise indicated in the following.

In the case of the variant according to FIG. 6, the light-emitting element 54a and the light-receiving element 56a are disposed with an oblique orientation in respect of the opening longitudinal axis 32a, i.e. the lobe axis 60a of the light-emitting element 54a is not parallel to the opening longitudinal axis 32a, but at an angle thereto. The same applies to the lobe axis 64a of the light-receiving element 56a. The radiating lobe 58a and the receiving lobe 62a overlap each other at the site of the reflective surface 48a, the opening longitudinal axis 32a passing through that region in which the radiating lobe 58a and the receiving lobe 62a are incident upon the reflective surface 48a. The variant according to FIG. 6 is suitable, for example, for embodiments in which the reflective surface 48a does not have scattering properties, but is constituted, for example, by a metallization. In any case, the operating principle is the same as in the design according to FIG. 4: changes in the distance of the reflective surface relative to the light-emitting element result in variations of the radiation intensity of the light arriving at the light-receiving element. With the spring characteristic of the biasing spring(s) used being taken into account, the force dragging on the guide rod 30 can be deduced from the measurement signal emitted by the light-receiving element.

Finally, reference is also to be made to FIG. 7. In this figure, also, elements that are the same or have the same function are denoted with the same references as in the previous figures, but again with a lower-case letter suffix. For explanation of these elements, reference is to be made to the statements above, unless otherwise indicated in the following.

In the case of the exemplary embodiment according to FIG. 7, the suspension system, by means of which the tub 14b of the washing machine 10b is suspended in the machine housing 12b, comprises at least one carrying-rod assembly 88b that comprises a carrying rod 16b, at one rod end of which there is an optical sensor 18b, and at the other rod end of which there is an elastic damper unit 90b. The carrying rod 16b extends, in an integrally joined manner, into the optical sensor 18b and constitutes the guide rod 30b thereof. In other words, the guide rod 30b is an integral part of the carrying rod 16b. Within the sensor housing 20b, the sensor 18b is of a design, for example, like that of the sensor 20 according to the exemplary embodiments of FIGS. 2 and 3.

The damper unit 90b comprises a damper housing 92b, accommodated in which there is a damper spring 94b, realized here as helical compression spring. The carrying rod 16b extends through the damper spring 94b and, via an end plug 96b, acts upon an axial spring end of the damper spring 94b. In the region of its other spring end, the damper spring 94b is supported on the damper housing 92b. A seating shell 98b that is fixedly connected to the tub 14b provides a seating for the damper unit 90b.

In the production of the washing machine 10b, the carrying-rod assembly 88b as such is pre-assembled. For the purpose of mounting this pre-assembled assembly in the washing machine 10b, the optical sensor 18b is then inserted in the seating shell 40b, and the damper unit 90b is inserted in the seating shell 98b. To make this possible, there are insertion slots, not represented in greater detail, provided in the seating shells 40b, 98b, such that the carrying-rod assembly 88b can be slid sideways into the seating shells 40b, 98b.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An optical sensor comprising:
   a sensor housing having a through-opening that connects a housing interior to a housing exterior wherein the through-opening defines an opening longitudinal axis;
   a guide rod that is guided in an axially displaceable manner in the through-opening and that projects into the housing interior;
   a reflective-surface carrier that is accommodated in the housing interior and that is motionally coupled to the guide rod, the reflective-surface carrier having a reflective surface; and
   a light-emitting element and a light-receiving element, which are both disposed in a stationary manner relative to the sensor housing and are at a distance from the reflective surface that is dependent on the axial position of the reflective-surface carrier,
   wherein at least one of the following conditions (a) to (d) is fulfilled:

(a) the light-emitting element and the light-receiving element are opposite each other in respect of the opening longitudinal axis;

(b) a lobe axis of a main radiating lobe of the light-emitting element and a lobe axis of a main receiving lobe of the light-receiving element are opposite each other in respect of the opening longitudinal axis;

(c) for at least some of the axial distances of the reflective surface that occur in the case of proper operation, the light-emitting element has a radiation characteristic having a main radiating lobe incident upon a site of incidence of the reflective surface wherein the opening longitudinal axis passes through the site of incidence;

(d) for at least some of the axial distances of the reflective, relative to the light-emitting element and the light-receiving element, that occur in the case of proper operation, the opening longitudinal axis passes through light rays that go from the reflective surface in the direction of the light-receiving element.

2. The optical sensor according to claim 1 wherein at least one of the main radiating lobe of the light-emitting element and the main receiving lobe of the light-receiving element has a lobe axis that is substantially parallel to the opening longitudinal axis, and the reflective surface has a surface normal that is substantially parallel to the opening longitudinal axis.

3. The optical sensor according to claim 1 wherein the reflective-surface carrier is inseparably connected to the guide rod.

4. The optical sensor according to claim 3 wherein the reflective-surface carrier is constituted by a plastic body injection-moulded on to the guide rod.

5. The optical sensor according to claim 1 wherein the reflective surface is formed in a depression that is central in relation to the opening longitudinal axis and that is formed on a side of the reflective-surface carrier that faces towards the light-emitting element and the light-receiving element.

6. The optical sensor according to claim 1 further comprising positioning formations, which are formed on at least one of the sensor housing and the reflective-surface carrier, the positioning formations permitting the optical sensor to be selectively equipped with one of a helical spring disposed centrally in relation to the opening longitudinal axis, or a plurality of helical springs disposed with a distribution at substantially equal angular distances around the opening longitudinal axis, for axially biasing the reflective-surface carrier relative to the sensor housing.

7. The optical sensor according to claim 1 wherein the guide rod is connected, in a region of a rod end that is outside of the housing interior, to a separately produced coupling piece designed for coupling with a rod-type connecting element.

8. The optical sensor according to claim 7 wherein the coupling piece has a transverse passage that enables an end hook of the connecting element to be hookingly engaged in the coupling piece.

9. The optical sensor according to claim 1 wherein the sensor housing has a housing lower part and a cover part, the housing lower part constitutes a pot-type housing portion that has a pot base, a pot casing and a pot opening, the through-opening extends through the pot base, and the cover part is placed on the pot-type housing portion.

10. The optical sensor according to claim 9 further comprising a printed circuit board carrying the light-emitting element and the light-receiving element, the printed circuit board covering the pot opening over the full opening extent thereof.

11. The optical sensor according to claim 9 further comprising a printed circuit board carrying the light-emitting element and the light-receiving element, the printed circuit board being clamped-in axially between the cover part and the pot casing.

12. The optical sensor according to claim 1 wherein the reflective-surface carrier constitutes a plate piece, which extends beyond an axial end of the guide rod and has a plate plane that is orthogonal to the opening longitudinal axis, which plate piece, on its plate side that faces away from the guide rod, has the reflective surface, and, on its other plate side, provides support points for one or more biasing springs, for biasing the reflective-surface carrier relative to the sensor housing.

* * * * *